United States Patent [19]

Tazi et al.

[11] Patent Number: 5,003,014
[45] Date of Patent: Mar. 26, 1991

[54] PROCESS FOR MAKING COPOLYMERS OF MALEIC ANHYDRIDE AND A $C_1$-$C_4$ ALKYL VINYL ETHER HAVING A PREDETERMINED SPECIFIC VISCOSITY

[75] Inventors: Mohammed Tazi, Wayne; John J. Ardan, Butler, both of N.J.

[73] Assignee: GAF Chemicals Corporation, Wayne, N.J.

[21] Appl. No.: 526,275

[22] Filed: May 21, 1990

[51] Int. Cl.$^5$ .................... C08F 2/00; C08F 6/00; C08F 34/00; C08F 16/12
[52] U.S. Cl. .................... 526/78; 528/498; 526/271; 526/332
[58] Field of Search .................... 526/78, 82

[56] References Cited

U.S. PATENT DOCUMENTS

| | | | |
|---|---|---|---|
| 4,255,309 | 3/1981 | Klaessig et al. | 524/517 |
| 4,532,320 | 7/1985 | Denzinger et al. | 528/498 |

FOREIGN PATENT DOCUMENTS 883850 12/1961 United Kingdom .................... 526/82

OTHER PUBLICATIONS

H. F. Mark, N. M. Bikales, C. G. Overberger, and G. Menges, Encyclopedia of Polymer Science and Engineering, vol. 9, p. 255 [Wiley-Interscience Publication] 1987.

James A. Kent, Riegel's Industrial Chemistry, (Reinhold Publishing Corp), 1962, pp. 303 and 305.

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

What is described herein is a process for making copolymers of maleic anhydride and $C_1$-$C_4$ alkyl vinyl ethers of predetermined specific viscosities extending over a wide viscosity range. The invention is characterized by (a) precharging a reactor with a $C_1$-$C_4$ alkyl vinyl ether as solvent and a polymerization initiator at a reaction temperature, (b) feeding a mixture of maleic anhydride and a $C_1$-$C_4$ alkyl vinyl ether in substantially stoichiometric amounts, preferably with a slight excess of alkyl ether, and at a selected rate, into said precharged reactor, (c) polymerizing said reactants to form a slurry of said copolymer in said escess alkyl vinyl ether solvent, and (d) introducing toluene into said reactor during the polymerization to control the specific viscosity of the copolymer product being produced.

7 Claims, 1 Drawing Sheet

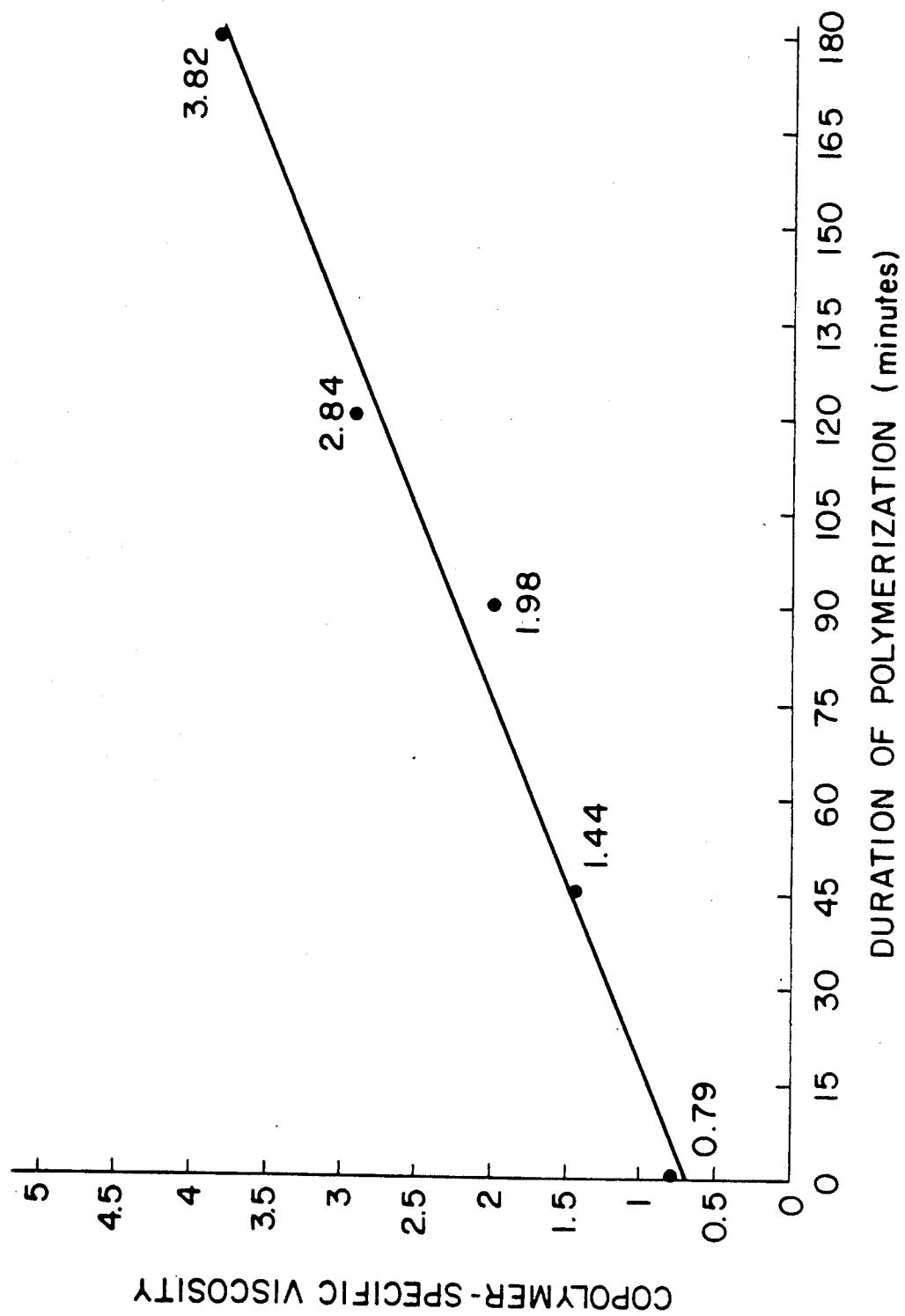

PROCESS FOR MAKING COPOLYMERS OF MALEIC ANHYDRIDE AND A $C_1$–$C_4$ ALKYL VINYL ETHER HAVING A PREDETERMINED SPECIFIC VISCOSITY

BACKGROUND OF THE INVENTION

1. Field of the Invention

This invention relates to copolymers of maleic anhydride and a $C_1$–$C_4$ alkyl vinyl ether, and, more particularly, to a general process for making such copolymers of predetermined specific viscosity.

2. Description of the Prior Art

Commercial processes are available for making copolymers of maleic anhydride and a $C_1$–$C_4$ alkyl vinyl ether. However, it has been found necessary to provide a different process for a copolymer of low specific viscosity, or molecular weight, than for a copolymer of medium range viscosity, and still another process for a copolymer of relatively high specific viscosity.

In these several processes, the molecular weight of the copolymer can be controlled either by adjusting the temperature of the polymerization, the concentration of the polymerization initiator and/or the kind of solvent utilized for the polymerization. Usually, higher polymerization temperatures will produce lower molecular weight copolymers, while higher concentrations of the polymerization initiator will produce lower molecular weight copolymers. The effect of the solvent used is to combine with the free radicals produced by the initiator to terminate the reaction at a point at which the weight copolymers. The effect of the solvent used is to combine with the free radicals produced by the initiator to terminate the reaction at a point at which the polymerization had progressed on a particular chain. This degree of interference with the polymerization on the part of the solvent can be determined from its chain transfer constant. Solvents having a low chain transfer constant, such as benzene, exhibit only a relatively slight tendency to interfere with chain-reaction type polymerizations; while solvents with a relatively high chain transfer constant, such as xylene, exert a rather high degree of interference with such polymerizations. Accordingly, for processes defined by a given polymerization temperature and initiator level, a low chain transfer constant solvent generally will produce higher viscosity (higher molecular weight) copolymers while higher constant solvents will provide lower viscosity (lower molecular weight) copolymers.

Accordingly, it is an object of this invention to provide a general process applicable for making copolymers of maleic anhydride and a $C_1$–$C_4$ alkyl vinyl ether having a predetermined specific viscosity extending a wide viscosity range.

A particular object of this invention is to provide a general process using a solvent having a high chain transfer constant, whose addition at different times during the polymerization can predetermine the specific viscosity of the copolymers produced.

These and other objects and features of the invention will be made apparent from the following description of the invention.

SUMMARY OF THE INVENTION

What is described herein is a general process for making copolymers of maleic anhydride and $C_1$–$C_4$ alkyl vinyl ethers of predetermined specific viscosities extending over a wide viscosity range. The invention is characterized by (a) precharging a reactor with a $C_1$–$C_4$ alkyl vinyl ether as solvent and a polymerization initiator at a reaction temperature, (b) feeding a mixture of maleic anhydride and a $C_1$–$C_4$ alkyl vinyl ether in substantially stoichiometric amounts, preferably with a slight excess of alkyl ether at a selected rate into said precharged reactor, (c) polymerizing said reactants to form a slurry of said copolymers in said excess alkyl vinyl ether solvent, and (d) introducing toluene into said reactor during the polymerization to control the specific viscosity of the copolymer product being produced.

DESCRIPTION OF THE DRAWING

The FIGURE is a graphical representation of the process of the present invention in which is plotted specific viscosity of the maleic anhydride-methyl vinyl ether copolymer produced vs. time of introduction and duration of feeding of a given amount of toluene during a polymerization period of three hours.

DETAILED DESCRIPTION OF THE INVENTION

In accordance with the present invention, there is provided a general process for making copolymers of maleic anhydride and a $C_1$–$C_4$ alkyl vinyl ether having predetermined specific viscosities extending over a wide viscosity range. In this general method, a suitable reactor is provided with appropriate inlet tubes, agitation means, and heater and temperature control means. The reactor is first purged with nitrogen to remove air from the system. Generally three separate purges are employed, at about 3 bars pressure and about 40° C. Then the reactor is precharged with a substantial excess of $C_1$–$C_4$ alkyl vinyl ether, preferably methyl vinyl ether, which is a solvent to facilitate agitation of the contents of the reactor before and during the polymerization. The solvent then is heated to a reaction temperature, generally about 50°–90° C. Thereafter a polymerization initiator also is charged into the reactor, suitably in a solution with some of the desired amount of alkyl vinyl ether solvent. Any suitable initiator known in the art may be used including but not limited to peroxides. Tertiary butyl or tertiary amyl peroxy pivalate are preferred. The concentration of initiator may vary widely, suitably about 0.05 to 2% by weight of maleic anhydride, although about 0.2% by weight usually will suffice for carrying out an effective polymerization.

Then separate feed tubes carrying molten anhydride and alkyl vinyl ether are combined in a static mixer and fed into the precharged reactor while agitating the solvent and intiator. The maleic anhydride and alkyl vinyl ether reactants usually are combined in substantially stoichiometric ratios of about 1:1, respectively, although a slight excess of alkyl vinyl ether monomer is preferred in order to assure that all the maleic anhydride will be complexed. Preferably a 1:1.05 to about 1:1.5 mole ratio is used, although 1:1.1 is preferred.

The combined maleic anhydride-alkyl vinyl ether feed stream is added to the reactor over a selected feed rate consistent with a suitable period of polymerization. A period of about 3 hours for addition of monomers is typical.

The total mole ratio of MVE:MA in the reactor suitably is about 3:1, although lower and higher ratios also may be used.

As a feature of the invention, during the polymerization a given amount of toluene is introduced into the reactor to control the course of the polymerization. An early introduction of toluene, i.e., a longer period of its presence during the polymerization, will influence the polymerization to a greater extent than a later introduction, and, consequently, the specific viscosity of the copolymer produced for early introduction will be much lower than for the later introduced toluene additions. The specific viscosity of the copolymer will be maximized if introduction of toluene is omitted during the polymerization.

The FIGURE shows these effects in a graphical representation. What is plotted therein is specific viscosity of the copolymer product vs. time of introduction of a given amount of toluene during a 3 hour period of polymerization. This data illustrates that copolymers having a predetermined specific viscosity can be produced by varying the time of introduction of a predetermined amount of toluene during a selected polymerization period.

For example, if a copolymer of relatively low specific viscosity is desired, toluene is added at the beginning or soon after polymerization starts, i.e. the point at which the combined maleic anhydride-alkyl vinyl ether stream is fed from the static mixer into the reactor; then the toluene addition is continued during the remainder of the period of feeding of such monomers.

In the absence of addition of any toluene during the polymerization, the specific viscosity of the copolymer is maximized. In this instance, the added toluene serves merely as a solvent for the copolymer when excess alkyl vinyl ether solvent is removed from the reactor.

After the polymerization, the reactor is cooled, excess alkyl vinyl ether is vented off and the copolymer slurry in toluene is discharged from the reactor. The copolymer can be recovered by filtration and drying as a fine, white powder of predetermined specific viscosity with very low residual toluene, generally less than 1%. The copolymer is quite stable as evidenced by the fact that its viscosity remains substantially constant even after periods of weeks or months.

The invention will now be described by reference to the following working examples of the invention.

EXAMPLE 1

A reactor was equipped with suitable inlet tubes, and agitation means, and heater and temperature control means, and purged three times with nitrogen at 3 bars pressure and at 40° C. The purged reactor then was precharged with 156.2 g. of methyl vinyl ether, heated to 58° C. and 0.150 g. of Lupersol 11 in ml of methyl vinyl ether was added. Then separate streams of 75 g. of molten maleic anhydride and 48.8 g. of methyl vinyl ether were combined in a static mixer and introduced into the reactor over a period of 3 hours while agitating the reaction mixture. After 45 minutes of addition of monomers, 225 g. of toluene was introduced into the reactor over the remaining 2-¾ hours of the period of polymerization. The contents of the reactor then were cooled and excess methyl vinyl ether vented. The product was discharged from the reactor. 95.4 g. (80.2% yield) of copolymer was obtained in the form of a fine, white powder. The specific viscosity of the copolymer obtained was 1.44. A triphenylphosphite test was negative showing the substantial absence of residual monomers. The toluene level in the copolymer was 0.75%. The viscosity remained substantially constant for 3 months.

Table 1 below summarizes the experimental conditions of this example.

TABLE I

| SUMMARY OF EXPERIMENTAL CONDITIONS OF EXAMPLE 1 ||||||||||
| Precharged Reactor ||| Feed Composition |||| Total Addition of Monomer || Polymerization |
| Excess MVE (g) | Initiator (g, wt %) | Temp. (°C.) | MA (g) | MVE (g) | Mole Ratio MA:MVE | Ratio MVE:MA | Toluene (g. hrs) | Period (hrs.) |
| 176.2 | 0.15, 0.2 | 58 | 75 | 48.8 | 1:1.1 | 3:1 | 225, 2.25 | 3 |

EXAMPLES 2-4

The procedure of Example 1 was followed with the exception that the same amount of toluene was introduced at different times during the polymerization. The results of Examples 1-4 are given below in Table II below.

TABLE II

| Ex. No. | Start of Addition of Toluene (hrs) | Duration of Addition of Toluene (hrs) | Copolymer Product ||| Specific Viscosity |
| | | | Yield || Residual Toluene (%) | |
| | | | g. | % | | |
| 1 | 0.75 | 2.25 | 95.4 | 80.2 | 0.75 | 1.44 |
| 2 | 1.5 | 1.5 | 92.9 | 77.8 | 1.00 | 1.98 |
| 3 | 2 | 1 | 95.5 | 80.3 | 0.99 | 2.84* |
| 4 | 0 | 3 | 104.0 | 87.3 | 0.70 | 0.79 |
| Control** | — | — | 87.7 | 73.7 | 0.63 | 3.82 |

**composite of three experiments
*toluene added only at end of polymerization to retain slurry after venting and before discharge.

What is claimed is:

1. A process for the production of copolymers of maleic anhydride and $C_1$–$C_4$ alkyl vinyl ethers of predetermined specific viscosities extending over a wide viscosity range of about 0.8 to about 3.8 which comprises:
   (a) precharging a reactor with $C_1$–$C_4$ alkyl vinyl ether solvent and a polymerization initiator at a reaction temperature,
   (b) feeding a mixture of maleic anhydride and a $C_1$–$C_4$ alkyl vinyl ether in substantially stoichiometric amounts into said precharged reactor at a selected rate, (c) polymerizing said reactants to form a slurry of said copolymer in said solvent, and
(d) introducing toluene into said reactor during the polymerization to control the specific viscosity of the copolymer product being produced.

2. A process according to claim 1 further including:
(d) venting excess alkyl vinyl ether,
(e) discharging the slurry copolymer product from the reactor, and
(f) recovering the copolymer as a fine, white powder.

3. A process according to claim 1 wherein a copolymer of relatively low specific viscosity is obtained when a given amount of toluene is introduced over an extended period of the polymerization.

4. A process according to claim 1 wherein a copolymer of relatively high specific viscosity is obtained when a given amount of toluene is introduced over a short period of the polymerization.

5. A process according to claim 1 wherein molten maleic anhydride and said alkyl vinyl ether reactants are fed through a static mixer into said reactor.

6. A process according to claim 1 wherein the precharged alkyl vinyl ether solvent maintains the copolymer in slurry form during the polymerization.

7. A process according to claim 1 wherein the total alkyl vinyl ether to maleic anhydride weight ratio in the reactor is about 3:1.

* * * * *